United States Patent
Bräutigam et al.

(10) Patent No.: US 11,858,556 B2
(45) Date of Patent: Jan. 2, 2024

(54) ENGINE ENCLOSURE FOR AN AGRICULTURAL MACHINE

(71) Applicant: AGCO International GmbH, Neuhausen (CH)

(72) Inventors: Markus Bräutigam, Marktoberdorf (DE); Andreas Kleinhenz, Osterreinen (DE); Franz Erhard, Seeg (DE); Thomas Maier, Unterthingau (DE); Simon Brack, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 109 days.

(21) Appl. No.: 17/645,920

(22) Filed: Dec. 23, 2021

(65) Prior Publication Data

US 2022/0204092 A1   Jun. 30, 2022

(30) Foreign Application Priority Data

Dec. 24, 2020 (EP) .................................... 20217298

(51) Int. Cl.
*B62D 25/10* (2006.01)
*B62D 65/06* (2006.01)
(Continued)

(52) U.S. Cl.
CPC .............. *B62D 25/12* (2013.01); *B60K 11/04* (2013.01); *B60K 13/02* (2013.01); *B62D 65/06* (2013.01); *B60Y 2200/221* (2013.01)

(58) Field of Classification Search
CPC ........ B62D 25/12; B62D 25/10; B62D 65/06; B60K 11/04; B60K 13/02; B60Y 2200/221
See application file for complete search history.

(56) References Cited

U.S. PATENT DOCUMENTS 3,487,887 A   1/1970   Pensa
3,805,909 A   4/1974   Koeppen
(Continued)

FOREIGN PATENT DOCUMENTS

EP   2258160 A1   12/2010
GB   1442911 A    7/1976

OTHER PUBLICATIONS

European Patent Office, Search Report for related European Application No. EP21 20 5934, dated Apr. 19, 2022.
(Continued)

*Primary Examiner* — Jacob M Amick

(57) ABSTRACT

A hood assembly for an agricultural vehicle such as a farm tractor has a first hood panel and a second hood panel pivotably attached to the first hood panel and movable from a first closed position to a second open position relative to the first hood panel. The first hood panel is an elongate body mounted above an engine of the vehicle and having a front end and a rear end joined by two side portions. The second hood panel wraps around the front end of the first hood panel and extends along the two sides thereof to respective pivotal attachments. The attachments have a common pivot axis which traverses the first hood panel in spaced-apart relation to the first hood panel front end. Opening the second hood panel provides maintenance access to a cooling package of the vehicle without opening or disassembling the remainder of the hood assembly.

20 Claims, 3 Drawing Sheets

(51) Int. Cl.
    *B62D 25/12*     (2006.01)
    *B60K 11/04*     (2006.01)
    *B60K 13/02*     (2006.01)

(56)     References Cited

U.S. PATENT DOCUMENTS

| | | |
|---|---|---|
| 5,215,157 A | 6/1993 | Teich |
| 5,730,240 A | 3/1998 | Hoffman et al. |
| 6,206,122 B1 | 3/2001 | Boothman et al. |
| 6,213,235 B1 | 4/2001 | Elhardt et al. |
| 7,096,987 B2 | 8/2006 | Moen et al. |
| 8,893,834 B2 | 11/2014 | Berkeland |
| 9,676,271 B1 * | 6/2017 | Barzen .................. B60K 11/08 |
| 2006/0000660 A1 | 1/2006 | Moen et al. |
| 2008/0006460 A1 * | 1/2008 | Giovannini ............... E02F 9/00 |
| | | 180/69.2 |
| 2011/0035903 A1 | 2/2011 | Sims |
| 2013/0074410 A1 | 3/2013 | Berkeland |
| 2017/0313363 A1 | 11/2017 | Plebani et al. |

OTHER PUBLICATIONS

UK Intellectual Property Office, Search report for related UK Application No. GB2100501.2, dated Jun. 24, 2021.

* cited by examiner

ENGINE ENCLOSURE FOR AN AGRICULTURAL MACHINE

CROSS-REFERENCE TO RELATED APPLICATION

This application claims the benefit of the filing date of European Patent Application 20217298.7, "Engine Enclosure for an Agricultural Machine," filed Dec. 24, 2020, the entire disclosure of which is incorporated herein by reference.

TECHNICAL FIELD

The present disclosure relates to engine housings or enclosures for agricultural machines such as farm tractors, and also to such machines when provided with such an enclosure.

BACKGROUND

The engine compartments of machines such as farm tractors are becoming progressively more crowded and space is at a premium, with many bulky components which have to be housed beneath the engine hood. At the same time, engine sizes (and consequently hood sizes) continue to increase as engine horsepower increases. This leads to maintenance issues because a conventional tractor hood extends over the full length of the engine compartment and is mounted via a hinged joint on a bulkhead or structural member at the cab end of the engine compartment. The weight of such an extended hood makes it difficult for a single operator or maintenance engineer to raise unaided without the provision of hydraulic cylinders or other raising mechanisms.

One approach to this problem is described in United States Patent Application Publication 2008/0006460 A1, "Hood Assembly for a Machine and a Method of Use Thereof," published Jan. 10, 2008, in which a working machine has a chassis having a rear mounted engine and radiator and an articulated engine housing in the form of a two-part hood assembly covering them both. In one articulated opening motion, the rearmost section of the hood assembly can be raised on a pivoting connection to enable access to the radiator. In the alternative opening motion, the whole hood assembly pivots about a second pivoting connection at the rear end of the rearmost hood section to enable access to the whole engine compartment, with the above-mentioned issues of the weight making opening difficult. Even opening the rearmost section only is not a lightweight option as it comprises top, rear, left, and right side panels on a support frame.

BRIEF SUMMARY

In some embodiments, a hood assembly for an agricultural vehicle includes a first hood panel and a second hood panel pivotably attached to the first hood panel and movable from a first position to a second position relative to the first hood panel. The first hood panel is an elongate body having a front end and a rear end joined by two side portions, and the second hood panel wraps around the front end of the first hood panel and extends along the two sides thereof to respective pivotal attachments. The pivotal attachments have a common pivot axis that traverses the first hood panel in spaced-apart relation to the first hood panel front end.

The second hood panel, which is movable from a first (closed) position to a second (open) position to enable access to the engine bay, is not required to include structural bracing to support the remainder of the hood assembly, and also is not required to have the extent to cover the area covered by the first hood portion. Consequently, the second hood portion may be constructed in a lightweight manner to enable easy opening by a single user for maintenance purposes, yet avoiding the cost and complexity of hydraulic support cylinders, sprung hinge joints, or other mechanisms to assist the raising of the hood.

The hood assembly may have a first sealing portion between the first and second hood panels in the vicinity of the front end of the first hood panel, the sealing portion being configured to prevent ingress of air when the second hood panel is in the first position relative to the first hood panel. The second hood portion may include a flange that extends laterally to overlap a peripheral portion at the front end of the first hood portion when in the closed position, with a rubber (or other material) seal attached to either one or each of the first and second hood portions.

A portion of the first hood panel may define an aperture covered by a dust screen, which aperture may be forward of the point where the second hood panel pivotably attaches, and the first hood panel may include one or more air guidance channels extending rearward, either from the aperture or from a further point (e.g., downstream of a cooling fan arrangement enclosed by the second hood portion) to carry or direct cooling air to components within the engine housing.

A portion of the second hood panel may include one or more apertures covered by respective dust screens. In addition to providing a screened inlet to a vehicle cooling package (described further below), having a portion or portions of the second hood panel formed from mesh or other screening material helps to limit the weight and make it still easier for a user to raise the second hood panel from the first to the second position without undue effort and without additional raising mechanisms.

In order to provide a more complete enclosure, the hood assembly may have one or more removable side panels attached to each of the side portions of the first hood panel.

In some embodiments, an agricultural vehicle includes a chassis, an operator cab, engine and cooling package mounted on the chassis, and a hood assembly as described above extending forward of the cab over the engine and cooling package.

The agricultural vehicle may include a bulkhead mounted to the chassis between the cab and engine, with the rear edge of the first hood panel attached to an upper edge of the bulkhead. The bulkhead, which serves to reduce heat and/or noise transmission from the engine to the cab, may be simpler and lighter than for conventional tractors having full-length hinged hoods or bonnets in which the full weight of the hood is required to be supported on a hinged mount on the bulkhead.

The vehicle cooling package may include a fan and one or more radiators, and movement of the second hood panel from the first (closed) position to the second (open) position provides external user access to the cooling package, for example for cleaning and general maintenance purposes. Suitably, the fan includes a fan shroud, and a second sealing portion is disposed between the second hood panel and the fan shroud when the second hood portion is in the first position.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

DETAILED DESCRIPTION

In the following, references to directions such as forward, reverse, left, right, up, and down are from the point of view of a driver in the cab of the vehicle described, and driving or looking in a forward direction.

Figure 1:
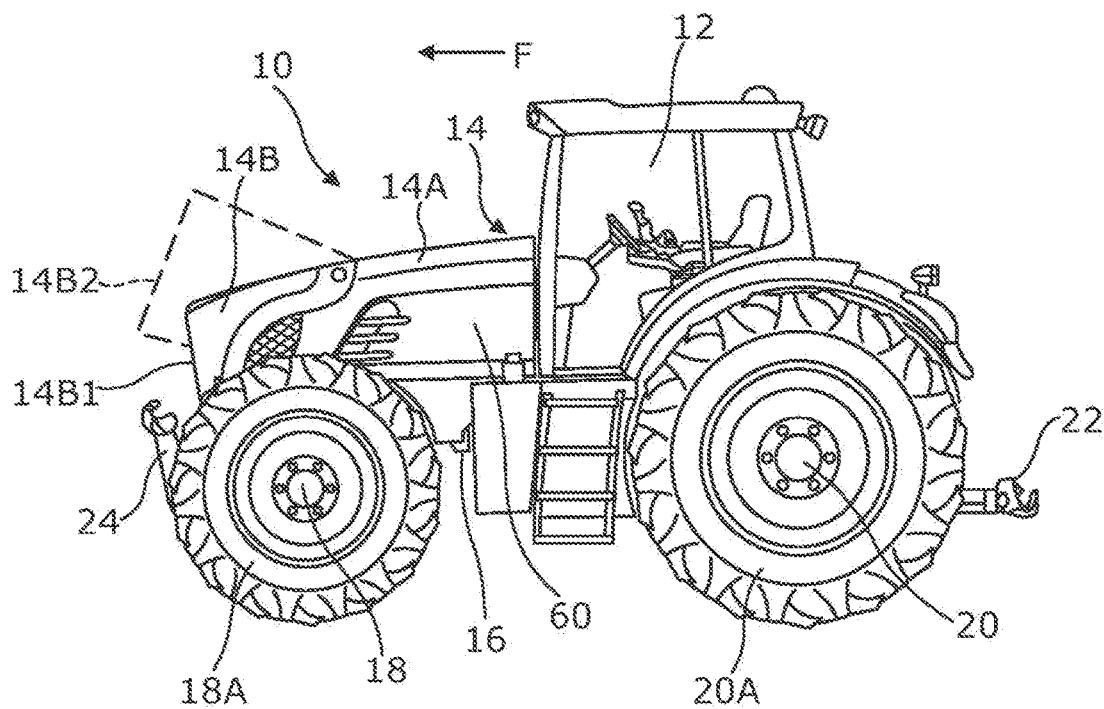
FIG. 1 shows a representation of an agricultural machine in the form of an agricultural tractor having an engine compartment enclosed by a hood arrangement.

FIG. 1 shows a representation of an agricultural machine, in the form of an agricultural or farm tractor 10. The tractor 10 comprises a user cab 12 to house an operator of the machine, an engine housing (identified generally at 14 and described further below), a chassis 16 on which the cab 12 and engine housing 14 are mounted, a front axle 18 carrying front vehicle wheels 18A, and a rear axle 20 carrying rear vehicle wheels 20A. Typically, the tractor will be provided with a rear three-point linkage system 22, and optionally also a front linkage 24, for the attachment of implements.

Figure 2:
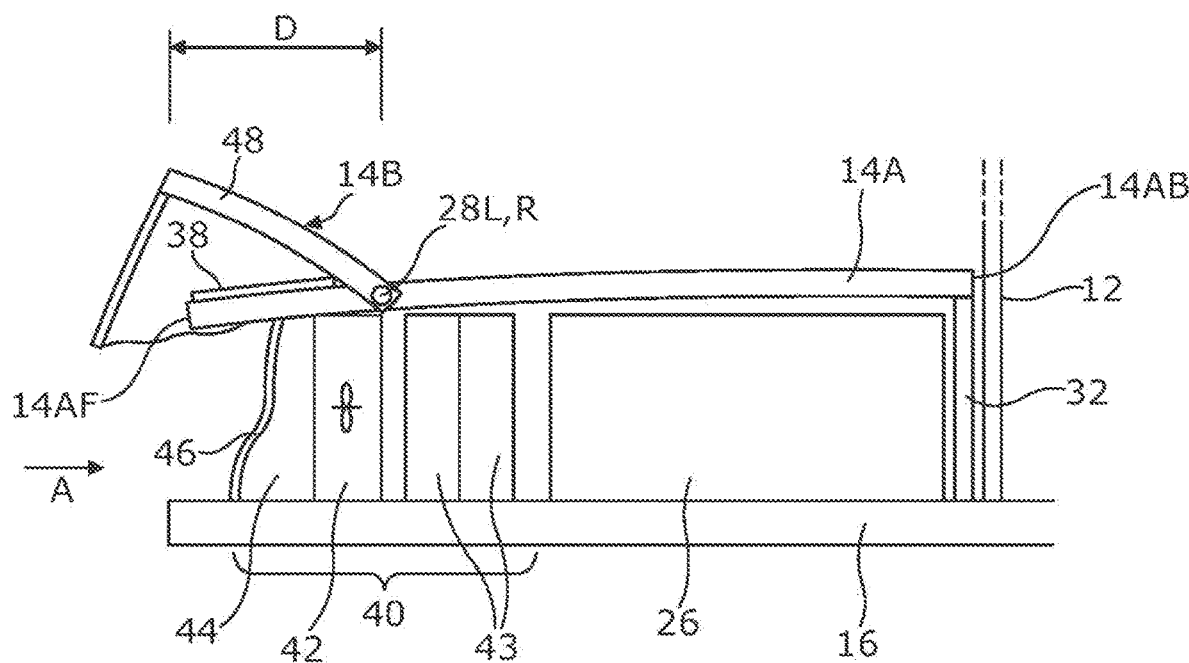
FIG. 2 shows a schematic sectional view through the engine compartment of the tractor of FIG. 1.

The engine housing 14 includes a hood assembly 14A, 14B, also shown in FIG. 2. The engine housing 14 shrouds an engine 26, which may be an internal combustion unit, an electric drive, or a hybrid arrangement. The engine 26 is mounted on the vehicle chassis 16, driving the rear axle 20 (and optionally also the front axle 18) via a transmission and driveline.

The engine housing hood assembly comprises a first hood panel 14A and a second hood panel 14B, which is pivotably attached to the first hood panel 14A at pivoting mounts 28L, 28R along the side of the first hood panel 14A at a distance D back from the front end of the first hood panel 14A. The distance D may suitably be from about 20 to about 50% of the length of the first hood panel 14A.

Figure 3:
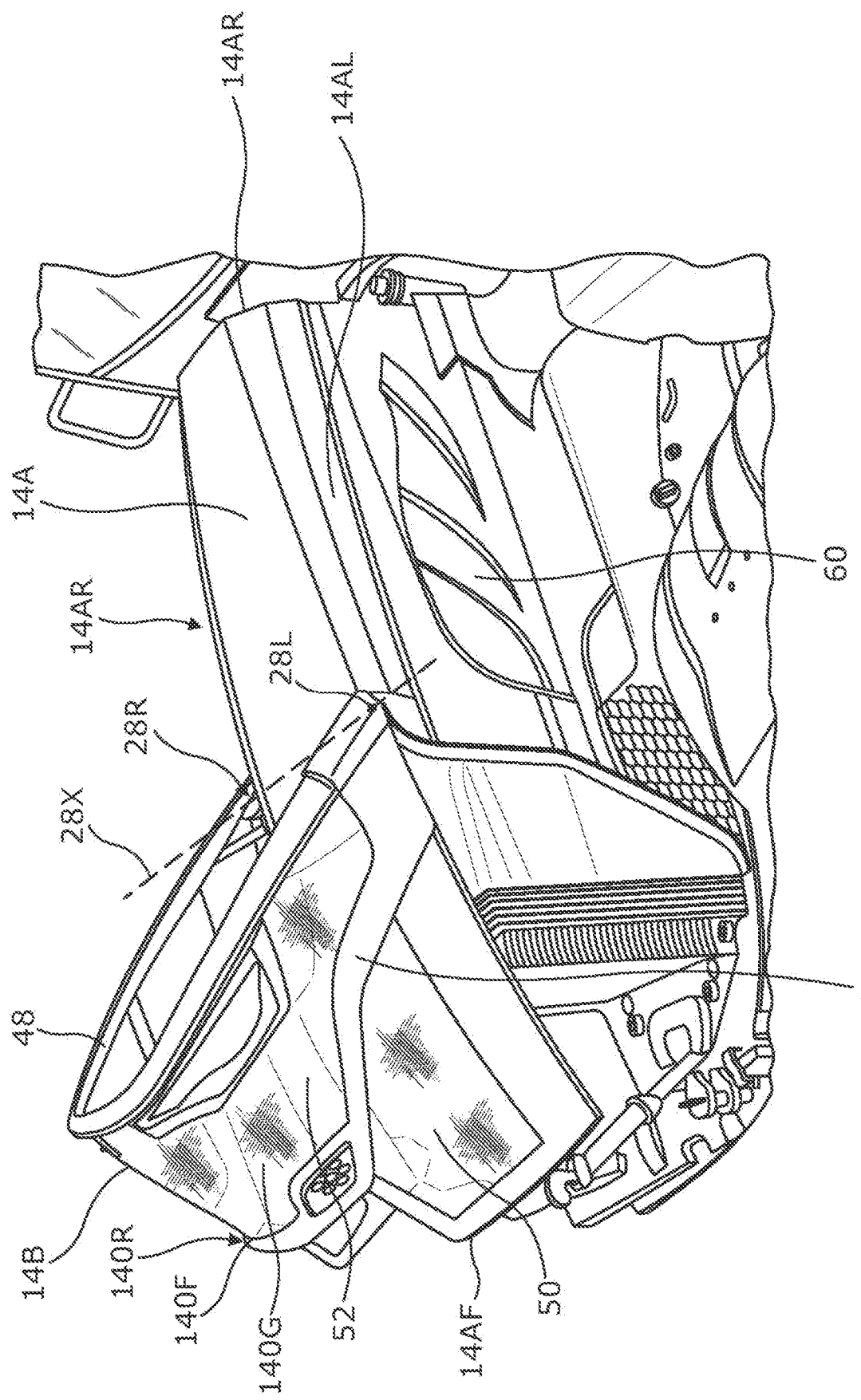
FIG. 3 shows a perspective view of the tractor of FIG. 1, with a portion of a hood assembly in a raised or open position.

The second hood panel 14B is movable from a first (closed) position 14B1, shown in solid outline in FIG. 1, to a second (open) position, shown by dashed outline 14B2 in FIG. 1, relative to the first hood panel 14A. As shown in FIG. 2 and FIG. 3, the first hood panel 14A is a generally elongate and approximately rectangular (when viewed from above) body having a front end 14AF and a rear or back end 14AB joined by two (left and right) side portions 14AL, 14AR. Of course, aerodynamic and/or styling additions may be added to the general shaping of the first hood panel 14A, but in general terms it remains a top plate mounted in fixed arrangement over the engine 26. The first hood portion 14A is mounted in a generally fixed orientation extending across the top of the engine 26 and a cooling package 30 (described below) forward of the engine, such that the first hood portion 14A extends substantially the whole of the length of the engine housing from the cab 12 to the front end of the vehicle.

The second hood panel 14B is generally U-shaped when viewed from above, having a supporting framework supporting a forward radiator guard portion 140F including an aperture closed by a dust-resistant mesh or grid 140G. At the side of the forward portion 140F in the U-shape, side arm portions 140L, 140R extend rearward towards the cab 12 up to the attached pivotal mounts 28L, 28R. As shown in FIG. 2 and FIG. 3, the vertical depth of the second hood panel 14B may reduce as the arm portions 140L, 140R approach the pivotal connections 28L, 28R. With this arrangement, the second hood panel 14B effectively wraps around the front end of the first hood panel 14A and extends along the two sides thereof to the left and right pivotal attachments 28L, 28R. The pivotal attachments 28L, 28R have a common pivot axis represented by dashed line 28X in FIG. 3, which common pivot axis traverses the first hood panel 14A in spaced-apart relation (i.e., by distance D shown in FIG. 2) to the first hood panel front end 14AF.

The hood assembly includes a first air seal (sealing portion) 38 disposed between the upper surface of the first hood portion 14A and the underside of the second hood panel 14B in the vicinity of the front end 14AF of the first hood panel 14A. The sealing portion 38 may be in the form of a rubber of plastic grommet or other compressible material configured to prevent ingress of air when the second hood panel is in the first (closed) position relative to the first hood panel 14A. The sealing portion may be attached to either of the hood portions, or both of them may comprise sealing strips or bodies to cooperate with the other when the hood assembly is closed. With reference to FIG. 3, the second hood portion 14B may include a flange 48 that extends laterally to overlap a peripheral portion at the front end 14AF of the first hood portion 14A when in the closed position, with the sealing portion 38 between the flange 48 and first hood portion 14A surfaces as a rubber (or other material) seal attached to either one or each of the first and second hood portions 14A, 14B.

Referring again to the sectional view of FIG. 2, the agricultural vehicle further comprises a bulkhead 32 mounted to the chassis 16 between the cab 12 and the engine 26. The rear edge 14AB of the first hood panel 14A is attached to an upper edge of the bulkhead 32, as shown in further detail in FIG. 4. The bulkhead 32, which conventionally links the engine compartment and cab (although they may be physically separated) serves to reduce heat and/or noise transmission from the engine 26 to the cab 12. The bulkhead 32 as disclosed may be simpler and lighter than bulkheads for conventional tractors having full-length hinged hoods, for which the full weight of the hood is required to be supported on a hinged mount on the bulkhead.

Forward of the engine 26 and mounted on the chassis 16 is a vehicle cooling package indicated generally at 40, which package includes a fan 42 and one or more radiators 43 arranged for the cooling of fluids on the vehicle (e.g., radiator coolant, hydraulic system fluid, brake fluid cooling, and so forth) by airflow driven by the fan 42 in known fashion. As indicated at arrow A in FIG. 2, movement of the second hood panel 14B from the first (closed) position to the second (open) position provides external user access to the cooling package 40, for example for cleaning and general maintenance purposes. Suitably, the fan 42 includes a fan shroud 44 and a further (second) sealing portion 46 in the form of a rubber or silicon bead for example is disposed between the second hood panel 14B and the fan shroud 44 when the second hood portion 14B is in the first position 14B1.

As noted above, the second hood panel 14B is movable from a first (closed) position to a second (open) position, and may be formed as a relatively light weight construction. This movement enables access to the engine bay. The second hood panel 14B need not include structural bracing to support the remainder of the hood assembly.

As shown in FIG. 3, a portion 50 of the first hood panel 14A may have an aperture covered by a dust screen, which aperture is adjacent to the front end 14AF and forward of the line 28X where the second hood panel 14B pivotably attaches at 28L, 28R. The first hood panel 14A suitably includes one or more air guidance channels extending rearward, either from the aperture portion 50 or from a further point—for example downstream of the cooling fan arrangement 40—to carry or direct cooling air to components within the engine housing 14.

In like manner to aperture 50, the second hood panel 14B has one or more apertures 52 covered by respective dust screens. In addition to providing a screened inlet to the vehicle cooling package 40, as previously indicated having a portion or portions of the second hood panel 14B formed from mesh or other screening material helps to limit the weight and make it still easier for a user to raise the second hood panel 14B from the first (closed) to the second (open) position without undue effort and without additional raising mechanisms.

Figure 4:
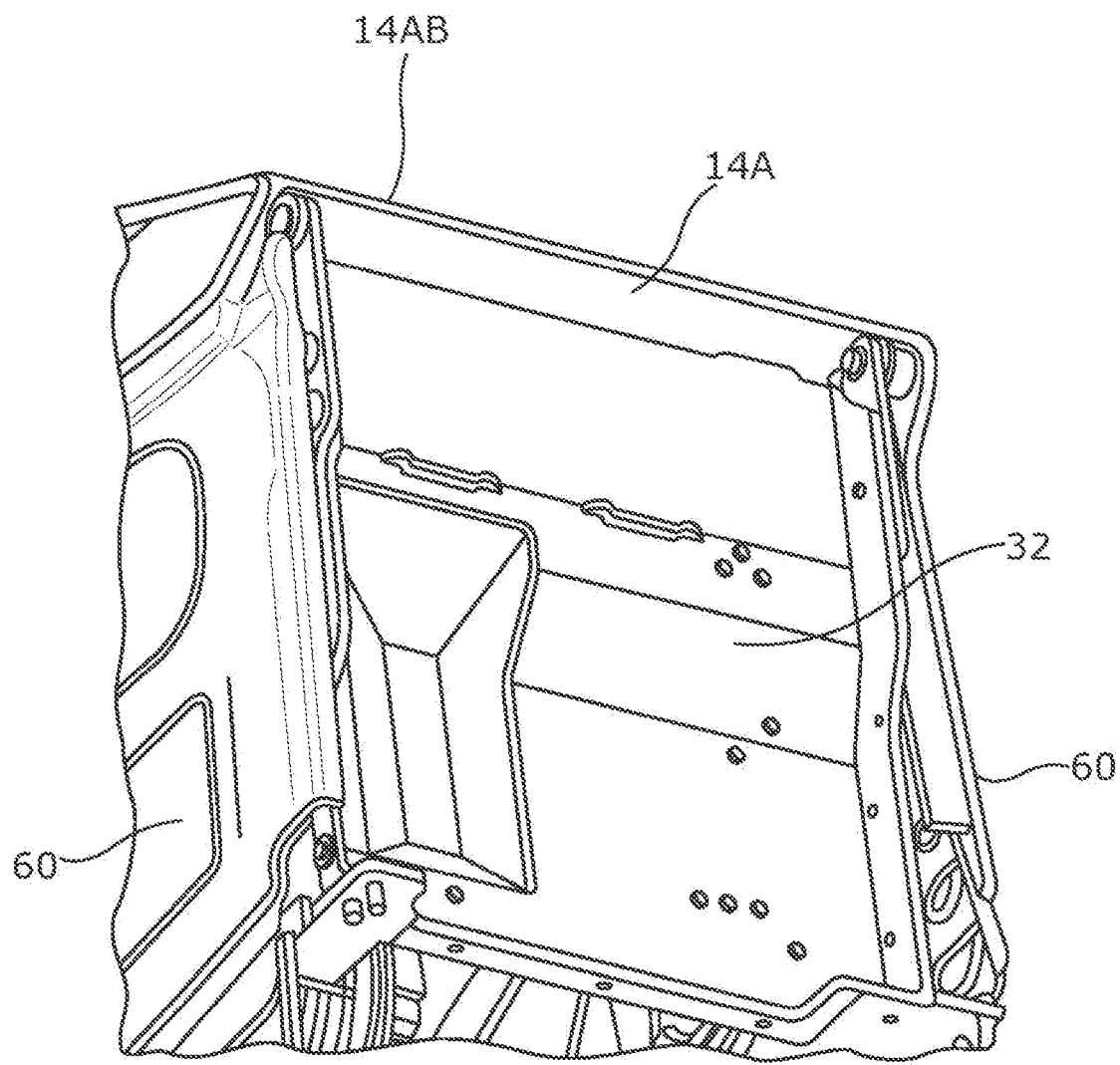
FIG. 4 shows a rear perspective view of the mounting of a portion of the hood assembly on a bulkhead of the vehicle, with the vehicle cab omitted for clarity.

With reference to FIGS. 1, 3, and 4, in order to provide a more complete enclosure, the hood assembly may have one or more removable side panels 60 attached to each of the side portions 14AL, 14AR of the first hood panel 14A. Such side panels 60 may be attached by bolts, screws, releasable clamps, or any other attachment mechanism, and their purpose is to protect the engine bay from dust and dirt ingress, while still permitting access for maintenance purposes. Because these panels 60 are attached to the first (fixed) hood portion 14A, they do not add to the weight required to be lifted to access the cooling package 40 through opening the second hood panel 14B.

Thus, a hood assembly for an agricultural vehicle such as a farm tractor 10 may include a first hood panel 14A and a second hood panel 14B pivotally attached to the first hood panel 14 A and movable from a first closed position to a second open position relative to the first hood panel 14A. The first hood panel 14A is an elongate body mounted above an engine 26 of the vehicle and having a front end 14AF and a rear end 14AB joined by two side portions 14AL, 14AR. The second hood panel 14B wraps around the front end 14AF of the first hood panel 14A and extends along the two sides thereof to respective pivotal attachments 28L, 28R. The attachments have a common pivot axis 28X which traverses the first hood panel 14A in spaced-apart relation to the first hood panel front end 14AF. Suitably, the opening second hood panel 14B provides maintenance access to a cooling package 40 of the vehicle without opening or disassembling the remainder of the hood assembly.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

It is also to be understood that the components disclosed here can consists out of one part or multiple parts. When two parts are connected fixedly to each other, this can mean that the two parts are for example welded together or connected in any known way or created via cast molding as one piece.

What is claimed is:

1. An agricultural vehicle, comprising:
    a chassis;
    an operator cab;
    an engine;
    a cooling package mounted on the chassis; and
    a hood assembly extending forward of the cab over the engine and cooling package, the hood assembly comprising:
    a first hood panel and a second hood panel, the second hood panel pivotably attached to the first hood panel and movable between a first position and a second position relative to the first hood panel, wherein the first hood panel is an elongate body having a front end and a rear end, the front end and the rear end joined by two side portions, and wherein the second hood panel is configured to wrap around the front end of the first hood panel and extend along the two sides thereof to respective pivotal attachments, the pivotal attachments having a common pivot axis which traverses the first hood panel in spaced-apart relation to the front end of the first hood panel such that the pivot axis is intermediate the front end and the rear end of the first hood panel.

2. The agricultural vehicle of claim 1, further comprising a bulkhead mounted to the chassis between the operator cab and the engine, wherein the rear end of the elongate body of the first hood panel is attached to an upper edge of the bulkhead.

3. The agricultural vehicle of claim 1, wherein the cooling package comprises a fan and at least one radiator, and wherein movement of the second hood panel from the first position to the second position enables external user access to the cooling package.

4. The agricultural vehicle of claim 3, wherein the fan comprises a fan shroud and a second sealing portion is disposed between the second hood panel and the fan shroud when the second hood portion is in the first position.

5. A hood assembly for an agricultural vehicle, the assembly comprising:
    an elongate first hood panel having a front end and a rear end, the front end and the rear end joined by two side portions; and
    a second hood panel pivotably attached to the first hood panel and movable between a first position and a second position relative to the first hood panel, wherein the second hood panel is configured to wrap around the front end of the first hood panel and extend along the two sides of the first hood panel to respective pivotal attachments, the pivotal attachments having a common pivot axis which traverses the first hood panel in spaced-apart relation to the front end of the first hood panel such that the pivot axis is intermediate the front end and the rear end of the first hood panel.

6. The hood assembly of claim 5, further comprising a first seal between the first hood panel and the second hood panel at the front end of the first hood panel, wherein the first seal is configured to prevent ingress of air when the second hood panel is in the first position relative to the first hood panel.

7. The hood assembly of claim 5, wherein a portion of the first hood panel defines an aperture covered by a dust screen.

8. The hood assembly of claim 7, wherein the first hood panel defines at least one air guidance channel extending rearward from the aperture.

9. The hood assembly of claim 5, wherein a portion of the second hood panel defines an aperture covered by a dust screen.

10. The hood assembly of claim 5, further comprising at least one removable side panel attached to each of the side portions of the first hood panel.

11. The hood assembly of claim 5, wherein the second hood panel has a front guard portion that interfaces with the front end of the first hood panel and two side arms, with each side arm extending rearwardly from the front guard toward a respective one of the side portions of the first hood panel such that the second hood panel is configured to wrap around the front end of the first hood panel and extend along a portion of the first hood panel to the pivotal attachments.

12. The hood assembly of claim 11, wherein the pivot axis is intermediate the front end and the rear end of the first hood panel and positioned from the front end a distance of between 20-50% of a total length of the first hood panel between the front end and the rear end.

13. The agricultural vehicle of claim 1, wherein the second hood panel has a front guard portion that interfaces with the front end of the first hood panel and two side arms, with each side arm extending rearwardly from the front guard toward a respective one of the side portions of the first hood panel such that the second hood panel is configured to wrap around the front end of the first hood panel and extend along a portion of the first hood panel to the pivotal attachments.

14. The agricultural vehicle of claim 13, wherein the pivot axis is intermediate the front end and the rear end of the first hood panel and positioned from the front end a distance of between 20-50% of a total length of the first hood panel between the front end and the rear end.

15. A hood assembly for an agricultural vehicle, the assembly comprising:

an elongate first hood panel having a front end, a rear end and two side portions that extend along a portion of the first hood panel from the rear end toward the front end; and a second hood panel pivotably attached to the first hood panel with pivotal attachments so as to be movable between a first position and a second position relative to the first hood panel, wherein the second hood panel has a front guard portion that interfaces with the front end of the first hood panel and two side arms, with each side arm extending rearwardly from the front guard toward a respective one of the side portions of the first hood panel such that the second hood panel is configured to wrap around the front end of the first hood panel and extend along a portion of the first hood panel to the pivotal attachments, wherein the pivotal attachments form a pivot axis which traverses the first hood panel, wherein the pivot axis is intermediate the front end and the rear end of the first hood panel and positioned from the front end a distance of between 20-50% of a total length of the first hood panel between the front end and the rear end.

16. The hood assembly of claim 13, further comprising a first seal between the first hood panel and the front guard portion of the second hood panel at the front end of the first hood panel, wherein the first seal is configured to prevent ingress of air when the second hood panel is in the first position relative to the first hood panel.

17. The hood assembly of claim 13, wherein a portion of the first hood panel defines an aperture covered by a dust screen.

18. The hood assembly of claim 15, wherein the first hood panel defines at least one air guidance channel extending rearward from the aperture.

19. The hood assembly of claim 13, wherein a portion of the second hood panel defines an aperture covered by a dust screen.

20. The hood assembly of claim 13, further comprising at least one removable side panel attached to each of the side portions of the first hood panel.

* * * * *